(12) United States Patent
Byde et al.

(10) Patent No.: US 7,433,841 B2
(45) Date of Patent: Oct. 7, 2008

(54) METHOD AND DATA STRUCTURE FOR PARTICIPATION IN MULTIPLE NEGOTIATIONS

(75) Inventors: Andrew Robert Byde, Bristol (GB); Christopher William Preist, Bristol (GB); Claudio Bartolini, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1141 days.

(21) Appl. No.: 10/094,193

(22) Filed: Mar. 8, 2002

(65) Prior Publication Data

US 2002/0178127 A1 Nov. 28, 2002

(30) Foreign Application Priority Data

Mar. 23, 2001 (GB) ................. 0107290.9

(51) Int. Cl.
G06Q 40/00 (2006.01)
(52) U.S. Cl. ............... 705/37; 705/26; 705/80
(58) Field of Classification Search ........... 705/26, 705/37, 80
See application file for complete search history.

(56) References Cited

U.S. PATENT DOCUMENTS

| | | | | |
|---|---|---|---|---|
| 5,905,975 | A * | 5/1999 | Ausubel | 705/37 |
| 6,021,398 | A * | 2/2000 | Ausubel | 705/37 |
| 6,026,383 | A * | 2/2000 | Ausubel | 705/37 |
| 6,035,287 | A * | 3/2000 | Stallaert et al. | 705/37 |
| 6,272,473 | B1 * | 8/2001 | Sandholm | 705/37 |
| 6,415,270 | B1 * | 7/2002 | Rackson et al. | 705/36 R |
| 6,564,192 | B1 * | 5/2003 | Kinney et al. | 705/37 |
| 6,704,716 | B1 * | 3/2004 | Force | 705/80 |
| 6,718,312 | B1 * | 4/2004 | McAfee et al. | 705/37 |
| 6,892,186 | B1 * | 5/2005 | Preist | 705/37 |
| 6,976,005 | B1 * | 12/2005 | Bansal et al. | 705/26 |
| 7,039,609 | B2 * | 5/2006 | Aoki | 705/37 |
| 7,043,446 | B1 * | 5/2006 | Dietrich et al. | 705/26 |
| 7,058,602 | B1 * | 6/2006 | La Mura et al. | 705/37 |
| 7,133,841 | B1 * | 11/2006 | Wurman et al. | 705/37 |
| 7,305,363 | B1 * | 12/2007 | Sandholm et al. | 705/37 |
| 7,346,571 | B1 * | 3/2008 | Fujita | 705/37 |
| 2001/0027431 | A1 * | 10/2001 | Rupp et al. | 705/37 |

(Continued)

FOREIGN PATENT DOCUMENTS

WO WO01/06405 A2 1/2001

OTHER PUBLICATIONS

Tuomas Sandholm, "An Algorithm For Optimal Winner Determination in Combinatorial Auctions", Proceedings of the Sixteenth International Joint Conference on Artificial Intelligence (IJCAI), pp. 6, (1999).*

(Continued)

*Primary Examiner*—Jagdish N Patel
*Assistant Examiner*—Sara Chandler (57) ABSTRACT

A method of participating by a purchaser in a plurality of negotiations for purchasable items, where an item may be a good or a service, in order to obtain one of a plurality of alternative collections of complementary purchasable items, comprising maintaining a probabilistic model of said negotiations and making bids or offers to increase the probability of success in negotiations for purchasable items in one of said alternative collections determined from current states of said negotiations and said probabilistic model as providing a largest expectation of value to the purchaser.

5 Claims, 2 Drawing Sheets

U.S. PATENT DOCUMENTS

2002/0046037 A1* 4/2002 Ausubel et al. ............... 705/1
2002/0069134 A1* 6/2002 Solomon ..................... 705/26
2002/0116315 A1* 8/2002 Grey et al. ................... 705/37
2007/0156575 A1* 7/2007 Sandholm et al. ............. 705/37

OTHER PUBLICATIONS

Yuzo Fujishima, Kevin Leyton-Brown Yoav Shoham, "Taming the Computational Complexity of Combinatorial Auctions: Optimal and Approximate Approaches," Proceedings of the Sixteenth International Joint Conference on Artificial Intelligence (IJCAI), pp. 6, (1999).*
Michael Rothkopf, Alexander Pekec and Ronald Harstad, "Computationally Manageable Combinatorial Auction", Rutcor Research Report, pp. 21, Apr. 1995.*
Noam Nissan, "Bidding and Allocation in Combinatorial Auctions", Proceedings of the ACM Conference on Electronic Commerce (ACM-EC) (2000).*
Moshe Tennenholtz, "Some Tractable Combinatorial Auctions", Proceedings of the National Conference on Artificial Intelligence (AAAI), Aug. 2000.*
Tuomas W. Sandholm and Subhash Suri, "Improved Algorithms for Optimal Winner Determination in Combinatorial Auctions and Generalizations," Proceedings of the National Conference on Artificial Intelligence (AAAI), (2000).*
Tuomas W. Sandholm, "eMediator: A Next Generation Electronic Commerce Server," Washington University, St. Louis, Department of Computer Science Technical Report, WU-CS-99-02, pp. 341-348, Jan. 1999.*
Holger Hoos and Craig Boutilier, "Solving Combinatorial Auctions using Stochastic Local Search," Proceedings of the National Conference on Artificial Intelligence (AAAI), Aug. 2000.*
John O. Ledyard, David Porter and Antonio Rangel: Experiments Testing MultiObject Allocation Mechanisms; Massachusetts Institute of Technology; Journal of Economics & Management Strategy; vol. 6, No. 3; Fall 1997; p. 639-676.*
Peter R. Wurman and Michael P. Wellman; "AkBA: A Progressive, Anonymous-Price Combinatorial Auction"; EC'00, Oct. 17-20, 2000, 9 pages.*
Frank Kelly and Richard Steinberg; "A Combinatorial Auction with Multiple Winners for Universal Service," Management-Science; vol. 46, No. 4; Apr. 2000, pp. 586-596.*
Christine Demartini, Anthony M. Kwasnica, John O. Ledyard and David Porter; "A New and Improved Design for Multi-Object Iterative Auctions,": Mar. 15, 1999; 45 pages.*
David C. Parkes, "iBundle: An Efficient Ascending Price Bundle Auction"; In Proc. ACM Conference on Electronic Commerce (EC-99), Denver, Nov. 1999; 10 pages.*
David C Parkes and Lyle H. Ungar; "Iterative Combinatorial Auctions: Theory and Practice,"; In Proc. 7th National Conference on Artificial Intelligence (AAAI-00), 8 pages.*
A Chavez, D. Dreilinger, et al. "A Real-Life Experiment in Creating an Agent Marketplace", Pros. Second International Conference on the Practical Application of Intelligent Agents and Multi-Agent Systems, 1977.

D. Cliff,e t al., "Less than Human: Simple Adaptive Trading Agents for CDA Markets", Proceedings of the 1998 Symposium on Computation in Economics, Finance, and Engineering: Economic Systems, 1998.
F. Dignum, et al., "Modeling Communication Between Cooperative Systems", Proceedings of the Conference on Advanced Information Systems Engineering (CAiSE '95), pp. 140-153, 1995.
P. Faratin, et al., "Negotiation Decision Functions for Autonomous Agents", Robotics and Autonomous Systems, 3-4(24): pp. 159-182, 1998.
P. Garcia, et al., "Possibilistic-Based Design of Bidding Strategies in Electronic auctions", Biennial European Conference on Artificial Intelligence, 1998.
S. Gjerstad, et al., "Price Formation in Double Auctions", Games and Economic Behavior, 1(22), pp. 1-29, 1998.
A.R. Greenwald, et al. "Shopbots and Pricebots, Proceedings of the 16th International Joint Conference on Artificial Intelligence", 1999.
N.R. Jennings, et al., "Using Intelligent Agents to Manage Business Processes", First International Conference on the Practice Application of Intelligent Agents and Multi-Agent Technology (PAAM-96), pp. 345-360, Apr. 1996.
S. Park, et al., "An Adaptive Agent bidding Stretegy Based on Stochastic Modelling", Proc. Third Conference on Autonomous Agents, 1999.
S. Parsons, et al., "Agents that Reason and Negotiate by Arguing", Journal of Logic and Computation, 8(3), pp. 261-292, 1998.
G. Piccinelli, et al., "Concepts and Tools for e-Service Development", Proc. 7th International Workshop HP OVUA, 2000.
G. Piccinelli,et al., "Dynamic e-Service Composition in Dysco", Part of the 21st International Cofnerence on Distributed Computing Systems (ICDCS-21), 2001.
C. Preist, "Commodity Trading Using an Agent-Based Integrated Double Auction", Proc. Third International Conference on Autonomous Agents, 1999.
C. Preist, et al., "Algorithm Design for Agents Which Participate in Multiple Simultaneous Auctions", F. Dignum and U. Cortest, editors, Agent Mediated Electronic Commerce III, Lecture Notes in Al. Springer Verlag, Sep. 2001a.
C. Preist, et al., "Economic Dynamics of Agents in Multiple Auctions", to appear at Autonomous Agents 2001, 2001b.
C. Preist, et al., "Adaptive Agents in a Persistent Shout Double Auction", Proceedigns of the 1st International Conference on the Internet, Computing and Economics, ACM Press, 1998.
J. Rosenchein, et al., Rules of Encounter, MIT Press, 1994.
T. Sandholm, emediator, "A Next Generation Electronic Commerce Server", Proc. Fourth International Conference on Autonomous Agents, 2000.
R.G. Smith, "The Contract Net Protocol: High Level Communication and Control in a Distributed Problem Solver", IEEE Transactions on Computing, 12(20), pp. 1104-1113, 1980.
N. Vulkan, et al., "Efficient Mechanisms for the Supply of Services in Multi-Agent Environments", Proceedings of the 1st International Cofnerence on teh Internet, Computing and Economics, ACM Press, 1998.
N. Vulkan, et al., "Automated Trading in Agent-Based Markets for Communication Bandwidth", Proc. UKMAS, 1999.

* cited by examiner

METHOD AND DATA STRUCTURE FOR PARTICIPATION IN MULTIPLE NEGOTIATIONS

TECHNICAL FIELD

The present invention relates generally to electronic commerce and, in particular, but not exclusively, to methods and data structures for use in the on-line purchase of composite services from a group of auctions.

BACKGROUND OF THE INVENTION

Over the past few years, Electronic Commerce has become an increasingly central part of the economy. An internet presence is considered an essential part of doing business, rather than an exotic add-on to a company. More and more transactions, both from business to consumer and between businesses, are taking place online. Simple fixed cost business transactions are often automated at one or both ends, and auctions are overwhelmingly conducted by automated auctioneer software. Agent technology has been proposed as a means of automating some of the more sophisticated negotiations which businesses are involved in. Background prior art documents are listed at the end of this description and hereafter are referenced by author and date of publication.

Research into automated negotiation has long been an important part of distributed AI and multi-agent systems. Initially it focused primarily on negotiation in collaborative problem solving, as a means towards improving co-ordination of multiple agents working together on a common task. As electronic commerce became increasingly important, the work expanded to encompass situations with agents representing individuals or businesses with potentially conflicting interests. The Contract Net (Smith, 1980) provides an early architecture for the distribution of contracts and subcontracts to suppliers. It uses a form of distributed request-for-proposals. However, it does not discuss algorithms for determining what price to ask in a proposal. Jennings et al. (1996) use a more sophisticated negotiation protocol to allow the subcontracting of aspects of a business process to third parties. This is primarily treated as a one-to-one negotiation problem, and various heuristic algorithms for negotiation in this context are discussed in (Faratin et al, 1998). Vulkan and Jennings (1998) recast the problem as a one-to-many negotiation, and provide an appropriate negotiation protocol to handle this.

Other relevant work in one-to-one negotiation includes the game-theoretic approach of Rosenschein and Zlotkin (1994) and the logic-based argumentation approach of Parsons et al. (1998). As much electronic commerce involves one-to-many or many-to-many negotiation, the work in the agent in community has broadened to explore these cases too. The Kasbah system (Chavez et al., 1997) featured agents involved in many-to-many negotiations to make purchases on behalf of their users. However, the algorithm used by the agents (a simple version of those in (Faratin et al., 1998) was more appropriate in one-to-one negotiation, and so gave rise to some counter-intuitive behaviours by the agents. Preist and van Tol (1998) and Cliff and Bruten (1998) present adaptive agents above to effectively bid in many-to-many marketplaces, and are the first examples of work which borrow techniques from experimental economics to analyze the dynamics of agent-based systems. Preist (1999) demonstrates how these can be used to produce a market mechanism with desirable properties. Park et al. (1999) present a stochastic-based algorithm for use in the University of Michigan Digital Library, another many-to-many market.

Gjerstad and Dickhaut (1998) use a belief-based modelling approach to generating appropriate bids in a double auction whose approach is close in spirit to that of the present invention in that it combines belief-based learning of individual agents bidding strategies with utility analysis. However, it is applied to a single double auction marketplace, and does not allow agents to bid in a variety of auctions. Vulkan and Preist (1999) use a more sophisticated learning mechanism that combines belief-based learning with reinforcement learning. Again, the context for this is a single double auction marketplace. Unlike Gjerstad's approach, this focuses on learning the distribution of the equilibrium price. The work of Garcia et al. (1998) is clearly relevant. They consider the development of bidding strategies in the context of the Spanish fish market tournament. Agents compete in a sequence of Dutch auctions, and use a combination of utility modelling and fuzzy heuristics to generate their bidding strategy. Their work focuses on Dutch rather than English auctions, and on a sequence of auctions run by a single auction house rather than parallel auctions run by multiple auction houses.

In Preist et al., 2001a, there are presented algorithms which allow agents to participate simultaneously in multiple auctions for the purchase of a number of similar goods. In Preist et al, 2001b, there is shown how agents using these algorithms in multiple auctions can create a more efficient and stable market. It is interesting to contrast this analysis with that of Greenwald and Kephart (1999). They demonstrate that the use of dynamic price-setting agents by sellers, to adjust their price in response to other sellers, can lead to an unstable market with cyclical price was occurring. Preist et al, 2001b, however, show that (in a very different context) the use of agents improves the dynamics and stability of the market. From this, it can concluded that agent technology is not a-priori "good" or "bad" for market dynamics, but that each potential role must be studied to determine its appropriateness.

Sandholm (2000) proposes a sophisticated marketplace able to handle combinatorial bidding, and able to provide guidance to buyers and sellers as to which market mechanism to adopt for a particular negotiation. In the long term, as the different auction houses merge or fold and only a few remain, this approach will be ideal. In the short term, the applicant expects improved market dynamics will occur through autonomous agents in multiple auctions.

A specific class of business process that will become increasingly important in the virtual economy, namely service composition. This application will now consider the different technical issues that the present applicant has identified must be addressed if service composition is to be automated, and describe, specifically, methods for the purchase of composite services from a group of auctions.

Over the last decade, companies have been encouraged by business consultants such as Tom Peters to focus on their core competencies. By trying to do everything—welding, graphic design, supply chain management, customer care, keeping the photocopiers running, producing good food in the office canteen—companies run the risk of being "jack of all trades, but master of none". As a result of this there is a danger that other smaller companies focused on the same core business will outperform them. To avoid that risk, and become more competitive, large companies are going through a process of "disaggregation". In some cases, this can mean splitting a large company into several parts, each of which can focus on one core business (such as the recent move by Hewlett Packard to separate its test and measurement business from its computing business, creating a new company, Agilent, from the former). In other cases, it can mean outsourcing more and more of a company's activities to other companies, maintaining only those activities that it truly excels in.

This trend is beginning to have an impact on many E-businesses, as well as traditional bricks-and-mortar companies. Companies would like to be able to outsource some of their activities over the internet. Initially, this has focused on semipermanent arrangements, with the web acting as an intermediary. (For example, career guidance information is provided to HP employees via a web-based third party). However, as this trend is becoming increasingly important, much research and development effort has been focussing on a new vision for the internet e-services. E-services are virtual entities that provide a service over the network through an open standard interface. The service may be information, such as the latest stock prices, or may be a virtual representation of some physical good or activity, such as a contract to transport a crate from one location to another. Because the service is offered through an open standard interface any client familiar with this standard can use it. Furthermore, the output from one service can be fed directly into another service. This makes creation of composite services and complex business processes which cross-organisational boundaries possible. Potentially, this can be done automatically and dynamically, and agent technology will play a key role in this.

This leads to the emergence of an important role in the virtual economy—the service composer. As companies focus on their core competencies, other companies can focus on creating composite packages. This is not new—travel agents, among others, have done exactly that for years—but what is new is that it will be able to take place dynamically, automatically, over the internet.

One specific aspect of the service composition problem is that of negotiating to purchase composable services. An agent's task may be to buy a set of service which can be composed to sell on as a bespoke composite service, possible to a specific customer with special requirements. There may be several ways of creating this composite service including individual services for sale in the auction. The agents task is to purchase one such set of services which can be composed, while reducing the risk of accidentally purchasing additional, unnecessary services. The present invention is directed to a method and data structure useful for this task.

SUMMARY OF THE INVENTION

In one aspect the present invention provides a method of participating by a purchaser in a plurality of negotiations for purchasable items, where an item may be a good or a service, in order to obtain one of a plurality of alternative collections of complementary purchasable items. The purchaser maintains a probabilistic model of said negotiations and make bids or offers to increase the probability of success in negotiations for purchasable items. The items will generally be found in one of said alternative collections. The bids to be made are determined from current states of said negotiations and said probabilistic model so as to provide a largest expectation of value to the purchaser.

It will be assumed in the specific embodiment to be described in detail below that a service composer is buying from a set of auctions only and that the customer of the service composer is offering to pay a certain fixed price—however, the invention is not limited to these conditions. The composite services could include fixed price elements, for example.

The purchaser may be a software agent run on a suitable computer platform.

The said step of making bids or offers may comprise placing bids or improving offers to improve the probability of leading in negotiations for the purchasable items in said one of said alternative collections.

An apparatus useful for participation in such a plurality of negotiations for purchasable items in order to obtain one of a plurality of alternative collections of complementary purchasable items, comprises a first module for providing a probabilistic model of said negotiations and a second module for making bids or offers. The second module makes bids or offers to increase the probability of success in negotiations for purchasable items in one of said alternative collections. The bids or offers are determined from current states of said negotiations and said probabilistic model as providing a largest expectation of value to the purchaser.

The method for a purchaser to bid in auctions to purchase a bundle of one or more purchasable items which together complete a predetermined requirement may comprise the steps of:

a) identifying a plurality of such bundles, each bundle being of one or more items, the items of each bundle together satisfying said predetermined requirement;
b) calculating the expected eventual cost of purchasing each item of all the bundles;
c) calculating the expected eventual cost of purchasing each of said plurality of bundles of said one or more items from said expected eventual cost of each item of all the bundles;
d) calculating in respect of each bundle an associated eventual purchasing cost being at least the sum of the expected eventual cost of withdrawing from negotiation for all those items not in the respective bundles and for which the current state of negotiation entails some degree of commitment to their purchase; and
e) entering bids for those items of the bundle for which the sum of the expected eventual cost of the bundle and the associated expected eventual cost for that bundle is least.

It is envisaged the bundle of services purchased by this method will generally of themselves satisfy the predetermined requirement but it may be in conjunction with other services, for example pre-bought in relation to an earlier transaction but not longer or that can be bought at an advertised fixed price.

When the negotiation takes the form of an English auction, the expected eventual cost of purchasing an item may be calculated from the expected distribution of closing prices for said items, for example from the distribution of closing prices for said item is based on past histories of auctions for said item and the expected eventual cost of purchasing each of said plurality of bundles may be calculated by summing the expected eventual costs of the items in the respective bundles.

In such an auction, the expected eventual purchasing cost of an item not in a given bundle may be calculated as the purchaser's current active bid (if any) for the item multiplied by the expected probability of the current bid being sufficient to purchase the item, the expected probability of the current bid for an item being sufficient to purchase the item being calculated from the expected distribution of closing prices for said item, for example, but other means of estimation may be employed if determined to be satisfactory.

The distribution of closing prices for said item may be based on past histories of auctions for the items.

The purchaser may be a software agent running on a suitable computer platform.

The sellers of the purchasable items may be identified by consultation with a matchmaker service via the internet, for example.

BRIEF DESCRIPTION OF THE DRAWINGS

Embodiments of the invention in its various aspects will now be described, by way of example only, with reference to accompanying drawings of which.

EMBODIMENTS OF THE INVENTION

Before describing in detail a specific embodiment of the invention, service composition and an exemplary context for the invention will be discussed.

Firstly, service composition and certain technical issues to be addressed for automated e-commerce are considered. In an automated business-to-business transaction, the participants can be expected, generally, to go through three conceptually separate phases; matchmaking, negotiation and service delivery. We will now briefly describe these three phases and then discuss how an enterprise involved in service composition might participate in them with reference to the early mentioned example scenario taken from the freight services domain.

Matchmaking Phase

Matchmaking is the process of putting service providers and service consumers in contact with each other. For matchmaking to take place, services that wish to be dynamically located must publish details of themselves, and entities wishing to locate such services may search for these details. Some of the services advertising themselves for matchmaking will be simple end-providers that can be negotiated with directly. Others may be brokers, auction houses and marketplaces that offer a locale for negotiating with and selecting among many potential providers offering similar services.

The services advertise a service description; a formal specification of the service they offer. Usually this information will be held in a central matchmaking directory When an entity wishes to locate a service of a certain type, it can query the matchmaker with a service request. This request may take a similar form to the service description, but may have certain fields unbound or constrained. The matchmaker returns, for example, a set of pointers to negotiations with appropriate service providers; in some cases these negotiations are one-to-one while others may be auctions, exchanges, etc. Each pointer may also have a contract template associated with it, showing the associated terms and conditions of the negotiations. (Of course, some of these may be uninstantiated or semi-instantiated and therefore open to negotiation). Standardisation is essential to fully allow effective matchmaking.

Negotiation Phase

After matchmaking, a service consumer is faced with a variety of potential negotiations. Its aim is to procure the best service, taking into account factors such as price, speed of delivery, etc. To do this, it should participate in one or more of these negotiations. Different negotiations will have different market mechanisms—sets of rules determining how the negotiation should take place. The simplest such mechanism consists of a single service, offering itself at a fixed, non-negotiable, price. Other services may be willing to enter into one-ton-one bargaining with potential customers, or conduct auctions. Others may post their availability through exchanges, together with may other similar services. As a result of this negotiation, the different parties will agree a contract with terms and conditions that give each member certain rights (such as the right to use a certain service) and obligations (such as the obligation to pay a certain price).

Service Delivery Phase

Once the terms and conditions of service execution have been agreed by the participant to negotiation, service execution can start. That involves interaction between the service provider and the service consumer, to act according to the terms and conditions established during the negotiation process.

Service Composition

The composite nature of the service impacts all the phases of a business transaction, and requires some modification to the standard, static view of these phases.

Matchmaking is traditionally viewed as a lookup process to find service providers able to meet a requestor's needs, prior to the requester selecting and/or negotiating with them. Service providers simply advertise information about the service they offer in a database, and requestors use this database to make their selection. However, if the virtual economy is to encourage dynamic service composition, more flexibility will be necessary at this stage. A provider will have some idea of the general services it is interested in offering, but will not know the full details. At any given time, it can estimate these details based on the current state of markets. Hence, if it is to participate in matchmaking, the matchmaker must play a more active role. It must route potential service requests to service composers, which then respond with a dynamic service advertisement detailing the closest service to the request they can offer. This advertisement should not be treated as binding—it is simply an estimate based on the current market situation. Negotiation would be required to reach a binding contract.

In context of dynamic service composition, additional requirements will generally be imposed on the service description to be advertised by the matchmaker and on the queries the system can deal with. The description should include abstract roles such as "insurance provider". The customer will know that these will be filled by subcontractors found by the service composer, but it will not know a priori who will take these roles.

The service composer may dynamically negotiate with potential subcontractors to determine exactly who will perform these tasks. Service composers must take into account any restrictions that potential customers may wish to place constraints over who plays the roles. For example, a customer may want to ensure that all subcontractors are members of appropriate trade bodies. For this reason, the service provider may need to give information to the customers during the matchmaking process about the names and/or details of potential subcontractors.

When the composer is either advertising a composite service or responding to a request through the matchmaker, then it needs models of how to decompose a service description into base service types that it can try to procure. Initially, this may be done at the service specification level. From a declarative description of the high level service, it may generate declarative descriptions of the sub-services which can be used during matchmaking to locate potential subcontractors.

The way in which a service request can be decomposed is not unique. The composer may generate many alternatives in advance, and then place requests for the base services. Alternatively, it can use the currently advertised services to inform the generation process. Which of these two strategies is appropriate will depend on whether the base services work in a "push" or "pull" advertising mode.

In the negotiation phase, the service composer can be expected to be involved in many interlinked negotiations. For any single bundle of base service types, the service composer will be involved in at least one, but more likely many negotiations to acquire instances of each service type. Furthermore, the service composer may simultaneously negotiate to purchase alternative bundles, in an effort to find which bundle is best. Ideally, it would like to do this in a non-committing way. However, some forms of negotiations (such as auctions) require participants to make a commitment when placing a bid, and provide no guarantees of success. When participating in negotiations of this kind, the provider of the composite service must take care to avoid buying incomplete or overly large bundles. Furthermore, the service composer may be simultaneously negotiating with potential client. In this case, it must trade off its expectation of winning such negotiations against an commitments it makes in the negotiations to purchase base services.

As we have seen in the matchmaking phase, the composite service provider relies on the declarative description of the sub-services when generating potential bundles of base services. During negotiation the service provider must ensure that the base services truly can inter-operate to provide the composite services. The declarative representation of the services can only guarantee this if the community as a whole defines standards of interoperability. If this is not the case, the declarative description will have to be refined. In addition to the specification of the services, the parties will need to agree on the protocol that they will use to communicate during service delivery (eg. what exchange of messages will take place to make a payment) and on the implementation of the interactions between the parties (eg. what is the format of the messages that are exchanged). For more details, see (Piccinelli and Lynden, 2000; Piccinelli and Mokrushin, 2001).

As the end of the negotiation phase, the service agreement forms the basis of a contract. Usually contracts will be between two parties. There will be one contract between the requestor and the service provider and one contract between the service provider and each subcontractor. However, in some circumstances, multi-party contracts may be appropriate. They provide additional security to the service provider by offloading risk onto the subcontractors and onto the client.

After the contract has been formed, service delivery can commence. During service delivery, it is the responsibility of the service provider that the execution proceeds smoothly. Therefore the service provider will orchestrate the execution flow and ensure that each component service inter-operates appropriately. The orchestration relies upon a monitoring infrastructure that makes use of all the levels of service descriptions—declarative specification, procedural protocols and implementation of interactions. The subcontractors will play roles that appear in these descriptions. In order to fulfil these roles, each subcontractor will obtain an appropriate view over the original description which it will execute.

Example Scenario: FreightMixer

In order to illustrate these concepts, we now introduce a novel, exemplary scenario to show the issues involved in service composition, and the impact of combined negotiation techniques. The scenario is taken from the freight domain. FreightMixer is an imaginary transport company that exploits cheap last-minute sales of excess hold space. While it may not be the quickest service, it aims to be the cheapest. Electronic marketplaces are both a source of resources (individual flight legs) and a channel for products (composite flights for a given customer).

FreightMixer does not own any transport infrastructure. Instead, it aims to dynamically design a cost-effective solution, using whatever third-party service is currently available cheaply. It composes these individual services together into a value-added solution which can be offered to customers at a premium. Its business model revolves around the dynamic acquisition of transport services at a competitive price, and the profitable sell of the composite service. Hence, effective negotiation techniques are crucial to the procurement as well as to the sales function of the company.

We now apply the three-stage model of business transactions to a typical deal generated by FreightMixer, and discuss what functionality a service composition company requires.

The knowledge that FreightMixer has of the freight market is the main asset for the company, and very basis on which its competitive advantage is built. Crucial aspects of this knowledge are captured electronically, allowing algorithms to automatically design and implement end-to-end solutions. In particular, it must have domain knowledge about when two flight legs can be linked together, and how to do this. It must know how much time is required to get the crate from one plane to the other, how to contract with appropriate ground staff in different airports to arrange the hand-over, and what paperwork is necessary to enter different airports.

During the matchmaking phase, FreightMixer is constantly monitoring the e-marketplaces where its services are demanded, looking for potential customers. Rather than simply advertising a fixed service in these markets, it observes the requirements of potential customers and proactively tries to create possible solutions for them. This it does by using the matchmaking service to locate possible individual components, and estimating the cost of purchase. If it finds one or more potential solutions at a good price, it will enter into negotiations with the possible customer, and also the service component suppliers.

FreightMixer may also choose to proactively advertise certain composite services during the matchmaking phase. If it expects demand for certain services, it can go out and provisionally negotiate for the individual components while waiting for clients to respond to the advertisement.

Now we consider the negotiation phase. Two crucial components of the IT infrastructure used by FreightMixer, exploiting the domain knowledge of the company, are its negotiation capability and its service composition capability. These two components work in co-operation, starting from a set of possible solutions identified during the matchmaking phase. These solutions will indicate a number of possible routes for the transportation of the goods, as well as the subsidiary services required (e.g. insurance, re-packaging, temporary storage).

A task force of agents will start to negotiate in the most appropriate marketplaces for the acquisition of the services. In doing so, it is necessary for appropriate algorithms to be chosen to meet the needs of the different aspects of the negotiation. Often, this may involve parallel negotiation in multiple marketplaces, and the use of different trading mechanisms (e.g. exchanges, auctions, RFQs). The negotiation activity can be expected to be based on multiple complex parameters, for example: pricing policy, interaction processes, time constraints, and payment procedure.

When a viable solution is found, FreightMixer negotiates in competition with other potential suppliers in order to secure the contract with the customer. Again the negotiation process will have to be managed, balancing profit optimisation with successful acquisition of the component services.

It may be possible for FreightMixer to enter into simultaneous negotiation with suppliers and customers. To do this, it would need to observe how well its supplier negotiations are progressing, and use that to determine how to behave in its customer negotiations.

When FreightMixer has bought appropriate components to meet a customer's need, and successfully negotiated with the customer to agree a contract, service can be delivered. During the service delivery phase, FreightMixer must ensure that the hand-over of the good at each stage of the journey takes place smoothly and appropriate paperwork is carried out.

In this way, FreightMixer is able to provide the same functionality as a large company despite the fact that its only assets are its market knowledge and organisation ability. Using this expertise, it can compete with established transport companies with large infrastructure.

Exemplary embodiments of the invention, particularly effective for use in the context discussed above, are now described below.

In the following description of exemplary embodiments it will be assumed that there is participation in a set of auctions, A, which will start at roughly the same time, but may finish at different times. Each auction is selling one good or service. The auctions are assumed to be ascending auctions, such as English auctions with a fixed closing time.

Participants can place bids at any time, provided the new bid is a minimum increment, $\epsilon$, above the last bid. We refer to the current highest bid in a given auction as the "active bid". We choose units in which this minimum increment is 1. When the auction closes, the good or service for sale is sold to the highest bidder at the price they bid. We also assume that the bid increment of each auction is very small with respect to the value of the good or service for sale.

To each subset $A \subset \mathbb{A}$ we associate a number $v(A)$, the "value" to the agent of winning the auctions A. By structuring the valuation of the agent as a function $v:2^{\mathbb{A}} \rightarrow \mathbb{R}$, we allow for complements and substitutes in the normal fashion. We define a bid set to be a pair (A,p), where $A \subset \mathbb{A}$ and $p:A \rightarrow \mathbb{Z}$ is a price function. The "utility" of winning a bid set (A,p) is $$u(A, p) = v(A) - \sum_{a \in A} p(a).$$

A probabilistic model of the expected outcomes of each auction is maintained, based on past performance of similar auctions. (Discussion of some possible ways of generating this model is provided in Preist et al. (2001a).)

To each auction $a \in \mathbb{A}$ is associated a price distribution $P_a: \mathbb{Z} \rightarrow [0,1]$ representing the belief that, with probability $P_a(p)$ auction a will close at price p.

We set $F_a(p) = \Sigma_{p' \geq p} P_a(p)$: the believed probability that auction a will close at or above price p. For subsets $A \subset \mathbb{A}$ we define $P_A(P)$ to be the believed probability that the auctions in A will close at the prices by a price function $p: A \rightarrow \mathbb{Z}$:

$$P_A(p) = \prod_{a \in A} P_a(p(a)), \quad (1)$$

and likewise $F_A$, the probability that the auctions in A will close at or above the prices specified by p:

$$F_A(p) = \prod_{a \in A} F_a(p(a)). \quad (2)$$

If the price in auction a is q, then it is believed that the probability of a bid at price $p \geq q$ winning is $$P_{win}(a, p, q) := \frac{P_a(p)}{F_a(q)}. \quad (3)$$

Similarly, for a bid set (A,p) with p now a function defined for each element of A, we define (assuming $p \geq q$), $$P_{win}(A, p, q) = \frac{P_A(p)}{F_A(q)}. \quad (4)$$

We now consider how these beliefs to calculate information about expected future utility of deals it may win. Firstly, we define the notion of the expected utility E(B,A,q) of a set of auctions B, given a set of observed prices q, and given that active bids are held in auctions A.

$$E(B,A,q) = v(B) - C(B \cap A, q) - C(B \setminus A, q+d) \quad (5)$$

where the function C(S,q') is the expected cost of winning the auctions S at prices greater than or equal to q':

$$C(S, q') = \sum_{p' \geq q'} \sum_{a \in S} P_{win}(a, p', q') p'(a) \quad (6)$$

The expected utility of a set of auctions is thus the value of the bundle, minus the expected cost of winning each of the auctions. The latter is calculated by using the believed probability that the auction will finish at each given price, if our agent places a bid at that price. We restrict p'>q for auctions B\A, in (5) because we know that the agent does not hold bids in these auctions at prices q, and so has no probability of winning at these prices.

The expression (5) gives us some idea of the intrinsic value of a bundle of goods B, but is not the expected return for placing a single bid in the auctions in B. In general, such a bid does not have an expected return: we must reason over complete strategies.

Consider the expected value (given that prices are currently q, and the agent holds the active bids A) of the following strategy, which we call "commitment to B": a set of auctions B, and for all future time steps, will always bid on any elements of B in which it does not hold active bids. If we stick to this commitment, then we know its future choices, and so precise formulae for expected return can be calculated.

Let S be a possible set of auctions that the agent may win using this strategy: $B \subset S \subset A \cup B$. The probability that the auctions S\B will not be outbid, while the auctions A\S are, is $$P_{ref}(S, A, q) = \frac{F_{A \setminus S}(q+d) P_{S \setminus B}(q)}{F_{A \setminus B}(q)}$$

Given this eventuality, the expected utility is evaluated in the same way as (5), except that instead of v(B), the value we obtain is v(S), and we occur additional costs for each auction in S\B that we win.

If follows that the expected value for following the commitment to B is $$E_c(B, A, q) = \qquad (7)$$
$$E(B, A, q) + \sum_{B \subset S \subset A \sim B} P_{ret}(S, A, q) \left[ (v(S) - v(B)) - \sum_{a \in S \setminus B} q(a) \right]$$

The terms in this expression for which S=B are the desired outcomes. The other terms correspond to obtaining some non-empty collection S\B of goods that do not contribute to our desired bundle B. Although they could still provide positive value, it is anticipated that in the service composition arena, where goods tend to complement one another, the slight increase of v(S) with respect to v(B) will not be large enough to compensate for the increase in costs $\Sigma_{q \in S \setminus B} q(a)$, and each of these terms would have a negative impact on the expected value of the commitment.

In one embodiment at each time step the commitment B is calculated which has largest expected utility $E_c(B,A,q)$ given the currently held bids A and prices q, and places the minimal bids required to take the lead in B\A. In practice, this means the initial bid in the auctions which have the highest a-priori expected utility, more bids will be made when outbid. However, if sufficient competing bids are placed to reduce the expected utility of this set of auctions, then it may change to another set of auctions, for another bundle. This will be done if the expected gain from changing to this new bundle outweighs the expected cost of currently held bids which appear in the old bundle but not in the new bundle.

There are two problems with this method. By its very nature, our algorithm does not in fact commit, since the options are re-evaluated at each opportunity. However, the value $E_c(B,A,q)$, which is truly the expected value of committing to bid on B, and hence is not the expected value according to the specified algorithm, is nonetheless (we claim) a good indication of the optimal choice to make. The estimate we use is conservative, in that the agent chooses a single bundle that will give the best overall expected utility. Choosing a different bundle for each possible outcome can only improve on this. The applicant has adopted this approach however as we believe that it will provide good performance in the majority of situations.

In practice, if the number of auctions is large it will be difficult to evaluate (7) given realistic computational resource bounds.

Figure 1:
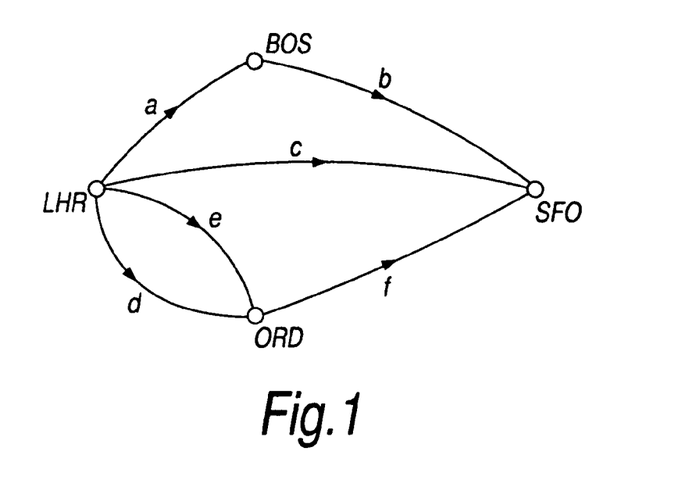
FIG. 1 is a graph of purchasable claims to meet a particular requirement.

We now return to the specific, exemplary FreightMixer scenario described in section 3. Imagine FreightMixer wishes to send a crate from Heathrow Airport London (LHR) to International Airport, San Francisco (SFO). The client is willing to pay $200. In order to meet this request, it searches for auctions of excess capacity on the web via a matchmaking facility. The route options it finds are illustrated in FIG. 1, namely route a LHR to Logan International Airport, Boston (BOS), route b BOS to (SFO), route c, LHR to SFO, route d, LHR to O'Hare International Airport, Chicago (ORD), e also LHR to ORD and f ORD to SFO. It is assumed these route options a to f are offered by enterprises A to F, respectively.

Figure 2:
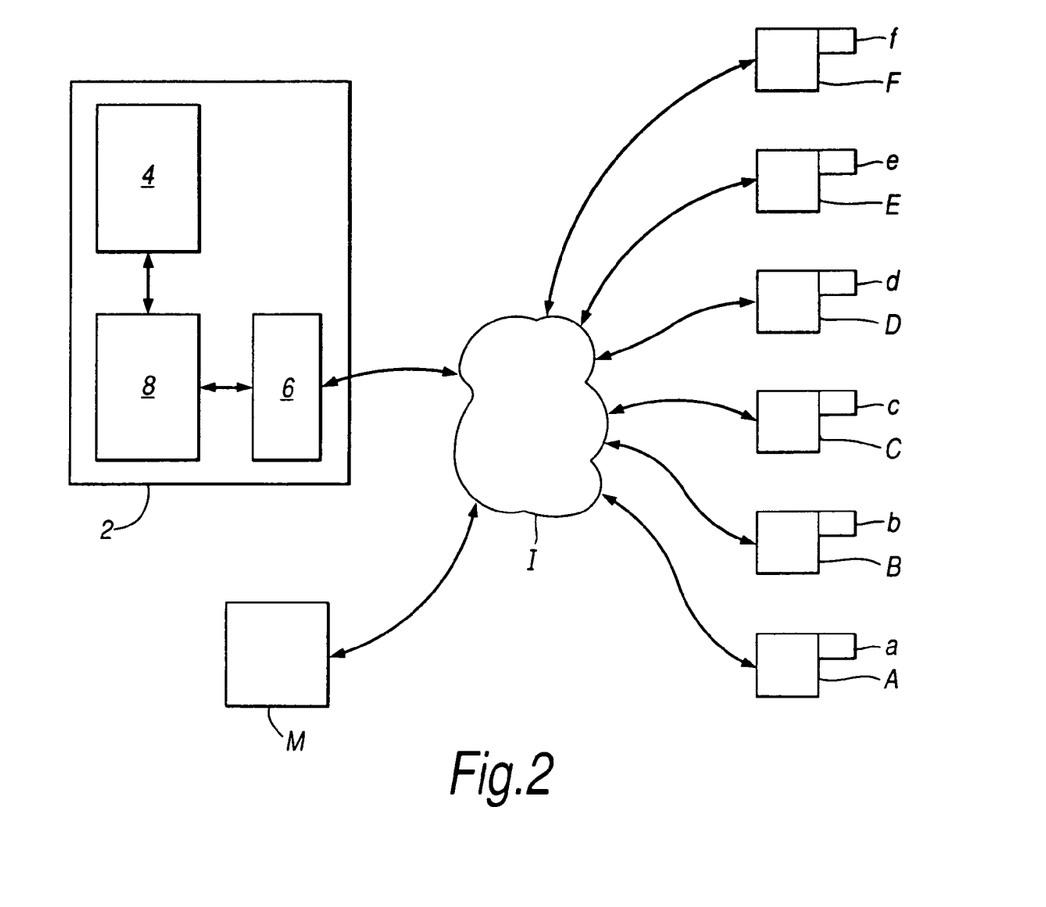
FIG. 2 is a schematic diagram of a system by which a method of the present invention may be practised with the data structure of the present invention.

Referring to FIG. 2, there is illustrated enterprises A to F and the respective services offered, a to f. A matchmaker M collects details of these services via publications of services by the enterprises A to F on the internet I. The details are provided to the purchaser P, also via the internet I.

The purchaser in this embodiment is a software agents running on a computer platform 2 which also includes a probabilistic model 4 and bidding means 6 for bidding in auctions for services a to f, also via the internet I.

Based on past histories of similar auctions, the agent creates beliefs about the expected distribution of closing prices of the auctions for these routes. We assume that the closing prices are uniformly distributed over the following sets, in this example.

a: {60, 65, . . . , 135, 140}
b: {20, 25, . . . ,95, 100}
c: {130, 135, 140, 145, 150}
d: {50, 55, . . . , 105, 110}
e: {80, 85, . . . , 115, 120}
f: {30, 35, . . . , 65, 70}

The bundles of services that can be bid in combination to meet the customer's requirement for shipment form LHR to SFO are therefore {a,b}, {c}, {d,f} and {e,f}.

The value of each bundle to the agent is the charge made to the client less the cost of the bundle. Before bidding begins the agent holds no bids and the expected cost of each service is taken to be the mean of the historical closing prices. The expected cost of a bundle is the sum of the expected costs of the services making up a given service bundle.

The expected utilities of committing to each of the bundles, which are to be seriously considered, are therefore the same as the initial expected values of the bundles:

$$E(\{a,b\},\phi,q_0)=40 \qquad (8)$$

$$E(c,\phi,q_0)=60 \qquad (9)$$

$$E(\{d,f\},\phi,q_0)=70 \qquad (10)$$

$$E(\{e,f\},\phi,q_0)=50 \qquad (11)$$

The agent therefore chooses to bid in {d,f}, even though the bundle {a,b} has the greater initial value of 120. This can be seen as sensible, given that by bidding for {a,b} the agent runs the risk of ending up committed to this bundle, even though it is non-optimal in expectation. It can be argued that the risk of such a commitment is low, since if the prices in a or b become prohibitively high, then the agent can simply wait, and with high probability will be outbid in these auctions, and so de-committed from them. It follows, however, that the agent also has correspondingly low probability of winning {a,b} at these low prices: The present invention addresses the payoff between the chance of a good deal and the chance of being committed to a bundle which our algorithm seeks to address. This payoff between expected return and commitment explicitly comes into effect, in this example if prices in d or f rise without the auction closing.

Suppose that prices in c, d and f have risen to 140, 75, 40. If the agent holds no bids, it should bid in c, since the expected cost of c given these prices is 147.5, whereas the expected cost of {d,f} is 97.5+57.5=155. Even if the agent holds the active bid in auction f then the "associated" cost of bundle {d,f} is, in this case, expected loss from accidentally winning f, which is the cost of f, 40, multiplied by the probability that no other agent will bid in f, 0.16666, is less than the difference between these expected costs of c and {d,f}, and so it is still preferable to bid for c despite the risk of winning f.

If, on the other hand, the agent holds the leading bid in d, then the potential cost of winning d is too high (expected loss 13.333) to risk bidding for c, despite the fact that c is, by now, expected to do better than {d,f}.

The benefit of the approach of the present invention over a greedy one is clear in the same situation. A greedy algorithm would continue to pursue {d,f} in preference to c until its current aggregate price was as large as that in c. For example, if prices in c, d and f were 145, 95 and 45 (and the agent held no bids) then a greedy algorithm would bid in {d,f} if preference to c. The reason why this is an inferior approach is that the probability of winning one of these auctions but not the other (at these prices), is large: 40%. If the agent wins one, then it is committed to bidding for the other, despite its large expected cost.

Figure 3:
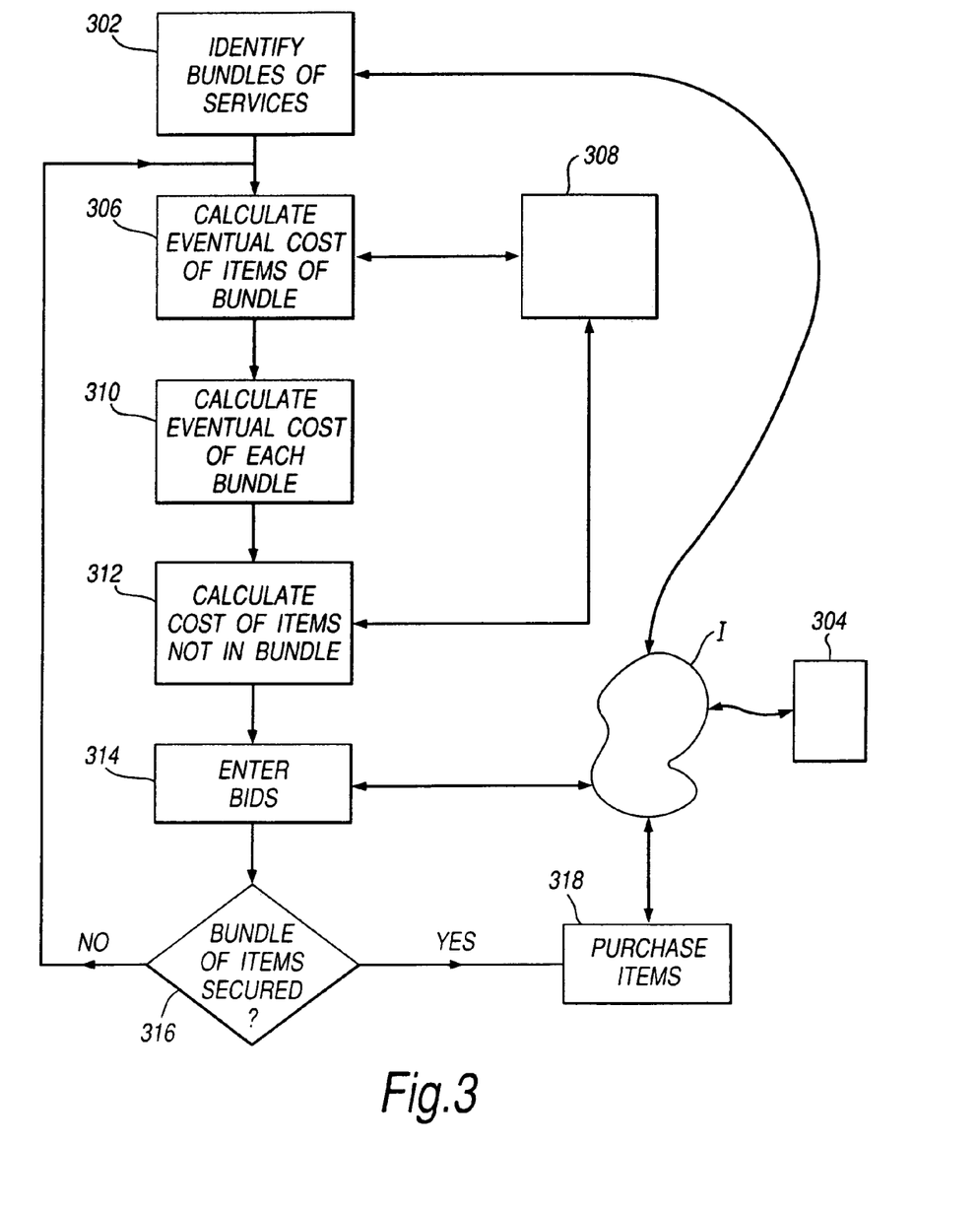
FIG. 3 is a flow chart of a method of the present invention.

A particular method of purchasing according to the present invention will now be described with reference to FIG. 3.

At step 302 the purchasing agent identifies a plurality of bundles of services, each bundle being of one or more items, the items of each bundle together satisfying a predetermined requirement. This is achieved by reference to a matchmaker service 304 via the internet.

The expected eventual cost of purchase of each items of all the bundles is then calculated at step 306, the expected eventual cost of purchasing an item being calculated from the expected distribution of closing prices for said item, the distribution of closing prices for each item being based, in this example, on past histories of auctions for the item stored in memory store 308.

The expected eventual cost of purchasing each of said plurality of bundles of said one or more items from said expected eventual cost of each item of all the bundles is then calculated at step 310.

There is then calculated, at step 312, in respect of each bundle an associated eventual purchasing cost being at least the sum of the expected eventual cost of withdrawing from auctions for those items not in the respective bundles, where the agent has the current active bid in the auction. This is calculated as the purchaser's current bid for those items multiplied by the expected probability of the current bids being sufficient to purchase these items. The expected probability of the current bid for an item being sufficient to purchase the item being calculated from the expected distribution of closing prices for the item, again as stored in memory 308.

Bids are then entered at step 314 via internet I for those items of the bundle for which the sum of the expected eventual cost of the bundle and the associated expected eventual cost for that bundle is least.

If the bids to secure a required bundle of items are successful as determined at step 316 then the purchases are secured at step 318. If the purchaser is outbid in any item required to secure a complete bundle of services the procedure is repeated from step 306.

The present invention addresses the key problem of effective negotiation for service composition, and provides methods and data structures to perform this task. The method competes in multiple simultaneous auctions, placing appropriate bids to create service bundles.

Throughout this application assumptions have been made regarding risk which are often not appropriate in practice. In particular we have assumed risk-neutrality, whereas in reality many potential users of service aggregation algorithms are risk-averse. Anyone skilled in the art of economics will be able to generalise straightforwardly the particularly described embodiment to include either risk-averse or risk-seeking behaviour.

REFERENCES

A. Chavez, D. Dreilinger, R. Guttman, and P. Maes. A real-life experiment in creating an agent marketplace. In *Proc. Second International Conference on the Practical Application of Intelligent Agents and Multi-Agent Systems*, 1997.

D. Cliff and J. Bruten. Less than human: Simple adaptive trading agents for cda markets. In *Proceedings of the 1998 Symposium on Computation in Economics, Finance, and Engineering: Economic Systems*, 1998.

F. Dignum and H. Weigand. Modelling communication between cooperative systems. In *Proceedings of the Conference on Advanced Information Systems Engineering (CAiSE'95)*, pages 140-153, 1995.

P. Faratin, C. Sierra, and N. Jennings. Negotiation decision functions for autonomous agents. *Robotics and Autonomous Systems*, 3-4(24):159-182, 1998.

P. Garcia, E. Giminez. L. Godo, and J. Rodrequez-Aguilar. Possibilistic-based design of bidding strategies in electronic auctions. In *Proc. $13^{th}$ Biennial European Conference on Artificial Intelligence*, 1998.

S. Gjerstad and J. Dickhaut. Price formation in double auctions. *Games and Economic Behaviour*, 1(22):1-29, 1998.

A. R. Greenwald and J. O. Kephart. Shopbots and pricebots. In *Proceedings of the $16^{th}$ International Joint Conference on Artificial Intelligence*, 1999.

N. R. Jennings, P. Faratin, M. J. Johnson, P. O. O'Brien, and M. E. Wiegand. Using intelligent agents to manage business processes. In *First International Conference on the Practical Application of Intelligent Agents and Multi-Agent Technology (PAAM-96)*, pages 345-360, April 1996.

S. Park, E. Durfee, and W. Birmingham. An adaptive agent bidding strategy based on stochastic modelling. In *Proc. Third Conference on Autonomous Agents*, 1999.

S. Parsons, C. Sierra, and N. R. Jennings. Agents that reason and negotiate by arguing. *Journal of logic and Computation*, 8(3):261-292, 1998.

G. Piccinelli and S. Lynden. Concepts and tools for e-service development. In *Proc. $7^{th}$ International Workshop HP OVUA*, 2000.

G. Piccinelli and L. Mokrushin. Dynamic e-service composition in dysco. part of the $21^{st}$ International Conference on Distributed Computing Systems (ICDCS-21), 2001.

C. Preist. Commodity trading using an agent-based iterated double auction. In *Proc. Third International Conference on Autonomous Agents*, 1999.

C. Preist, C. Bartolini, and I. Philips. Algorithm design for agents which participate in multiple simultaneous auctions. In F. Dignum and U. Cortes, editors, *Agent Mediated Electronic Commerce III*, Lecture Notes in AI. Springer Verlag, September 2001a.

C. Preist, A. Byde, and C. Bartolini. Economic dynamics of agents in multiple auctions. To appear at Autonomous Agents 2001, 2001b.

C. Preist and M. van Tol. Adaptive agent sin a persistent shout double auction. In *Proceedings of the $1^{st}$ International Conference on the Internet, Computing and Economics*. ACM Press, 1998.

J. Rosenchein and G. Zlotkin. *Rules of Encounter*. MIT Press, 1994.

T. Sandholm, emediator: A next generation electronic commerce server. In *Proc. Fourth International Conference on Autonomous Agents*, 2000.

R. G. Smith. The contract net protocol: High level communication and control in a distributed problem solver. *IEEE Transactions on Computing*, 12(29):1104-1113, 1980.

N. Vulkan and N. Jennings. Efficient mechanisms for the supply of services in multi-agent environments. In *Proceedings of the 1st International Conference on the Internet, Computing and Economics.* ACM Press, 1998.

N. Vulkan and C. Preist. Automated trading in agents-based markets for communication bandwidth. In *Proc. UKMAS,* 1999.

What we claim is:

1. A method of participating by a purchaser in a plurality of negotiations for purchasable items, where an item may be a good or a service, in order to obtain one of a plurality of alternative collections of complementary purchasable items, comprising:

inputting in a computer processor a requirement for at least one item desired to be purchased;

identifying by the computer processor the plurality of alternative collections of complementary purchasable items that satisfy the requirement;

maintaining in a computer memory accessible by the computer processor a probabilistic model for each one of said plurality of negotiations, wherein said probabilistic model contains computer executable codes which perform the following process:

communicating the identified plurality of alternative collections of complementary purchasable items to said probabilistic model;

retrieving results from past negotiations from a database for said complementary purchasable items, said results including past successful bids or offers used to purchase said complementary purchasable items in past negotiations;

calculating an expected cost to said purchaser of purchasing each purchasable item in the alternative collection of complementary purchasable items based on said past successful bids or offers used to purchase said complementary purchasable items in said past negotiations; and determining an expected value for said alternative collection of complementary purchasable items, wherein the expected value for the alternative collection of complementary purchasable items comprises a difference between a worth of said alternative collection of complementary purchasable items and a sum of the expected costs for each purchasable item in said alternative collection of complementary purchasable items, the worth being an input value obtained from the purchaser;

receiving the determined expected values for each of the plurality of the alternative collections of complementary purchasable items at the computer processor by executing the probabilistic model for each one of said plurality of negotiations;

identifying by the computer processor at least one collection of the plurality of the complementary collections of purchasable items, wherein the identified complimentary collection has the highest expected value among the expected values determined by the probabilistic model; and making bids or offers on behalf of the purchaser for purchasable items in the identified collection meeting the requirement, wherein said purchasable items are offered to be purchased in combination to meet a predetermined quantity requirement and to meet a purchaser's or a customer's offered price to pay for said combination of purchasable items comprising different goods or services.

2. A method as claimed in claim 1, wherein the purchaser is a software agent.

3. A method as claimed in claim 1 or claim 2, wherein said step of making bids or offers comprises placing bids or improving offers to improve the probability of leading in negotiations for the purchasable items in said one of said alternative collections.

4. An apparatus for participation in a plurality of negotiations for purchasable items in order to obtain one of a plurality of alternative collections of complementary purchasable items, comprising:

means for running a first software module arranged to provide a probabilistic model for each one of said plurality of negotiations, wherein said probabilistic model retrieves results from past negotiations from a database for said complementary purchasable items, said results including past successful bids or offers used to purchase said complementary purchasable items in past negotiations; calculates an expected cost of purchasing each purchasable item in an alternative collection of complementary purchasable items based on said past successful bids or offers used to purchase said complementary purchasable items in said past negotiations; and determines an expected value for said alternative collection of complementary purchasable items, wherein the expected value for the alternative collection of complementary purchasable items comprises a difference between a worth of said alternative collection of complementary purchasable items and a sum of the expected costs for each purchasable item in said alternative collection of complementary purchasable items, the worth being an input value obtained from the purchaser; and means for running a second software module arranged to:

input in a computer processor a requirement for at least one item desired to be purchased;

identify by the computer processor the plurality of alternative collections of complementary purchasable items that satisfy the requirement;

communicate the identified plurality of alternative collections of complementary purchasable items to said probabilistic model;

receive the determined expected values for each of the plurality of the alternative collections of complementary purchasable items at the computer processor by executing the probabilistic model for each one of said plurality of negotiations;

identify by the computer processor at least one collection of the plurality of the complementary collections of purchasable items, wherein the identified complimentary collection has the highest expected value among the expected values determined by the probabilistic model; and make bids or offers on behalf of the purchaser for complementary purchasable items in the identified collection meeting the requirement, wherein said purchasable items are offered to be purchased in combination to meet a predetermined quantity requirement and to meet a purchaser's or a customer's of a purchaser's offered price to pay for said combination of purchasable items comprising different goods or services.

5. A method of participating by a purchaser in a plurality of negotiations for purchasable items, where an item may be a good or a service, in order to obtain one of a plurality of alternative collections of complementary purchasable items, comprising:

inputting in a computer processor a requirement for at least one item desired to be purchased;

identifying by the computer processor the plurality of alternative collections of complementary purchasable items that satisfy the requirement;

maintaining in a computer memory accessible by the computer processor a probabilistic model for each one of said plurality of negotiations, wherein said probabilistic model contains computer executable codes which perform the following process:

communicating the identified plurality of alternative collections of complementary purchasable items to said probabilistic model;

retrieving results from past negotiations from a database for said complementary purchasable items, said results including past successful bids or offers used to purchase said complementary purchasable items in past negotiations;

calculating an expected cost to said purchaser of purchasing each purchasable item in the alternative collection of complementary purchasable items based on said past successful bids or offers used to purchase said complementary purchasable items in said past negotiations; and determining an expected value for said alternative collection of complementary purchasable items, wherein the expected value for the alternative collection of complementary purchasable items comprises a difference between a worth of said alternative collection of complementary purchasable items and a sum of the expected costs for each purchasable item in said alternative collection of complementary purchasable items, the worth being an input value obtained from the purchaser;

receiving the determined expected values for each of the plurality of the alternative collections of complementary purchasable items at the computer processor by executing the probabilistic model for each one of said plurality of negotiations;

identifying by the computer processor at least one collection of the plurality of the complementary collections of purchasable items, wherein the identified complimentary collection has the highest expected value among the expected values determined by the probabilistic model;

making an initial bid or offer on behalf of the purchaser for complementary purchasable items in the identified collection meeting the requirement;

after making a prior bid or offer, determining an updated expected value for each one of said alternative collections of complementary purchasable items, wherein the expected value for each alternative collection of complementary purchasable items comprises a difference between said worth of said alternative collection of complementary purchasable items being considered and a sum of the expected costs for each purchasable item in said alternative collection of complementary purchasable items being considered and losses that are probabilistically likely to occur in active negotiations for items not part of said alternative collection being considered; and making another bid or offer on behalf of the purchaser for complementary purchasable items in a newly identified collection meeting the requirement, wherein the newly identified collection has the highest expected value among the updated expected values determined by the probabilistic model, wherein said purchasable items are offered to be purchased in combination to meet a predetermined quantity requirement and to meet a purchaser's or a customer's offered price to pay for said combination of purchasable items comprising different goods or services.

* * * * *